(12) United States Patent
Coolich

(10) Patent No.: US 11,318,723 B2
(45) Date of Patent: May 3, 2022

(54) PACKAGING FILMS WITH IMPROVED HOT-TACK PERFORMANCE

(71) Applicant: Bemis Company, Inc., Neenah, WI (US)

(72) Inventor: Melissa Kanzelberger Coolich, Hortonville, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 16/466,297

(22) PCT Filed: Dec. 22, 2016

(86) PCT No.: PCT/US2016/068351
§ 371 (c)(1),
(2) Date: Jun. 4, 2019

(87) PCT Pub. No.: WO2018/118068
PCT Pub. Date: Jun. 28, 2018

(65) Prior Publication Data
US 2019/0337275 A1  Nov. 7, 2019

(51) Int. Cl.
*B32B 27/32* (2006.01)
*B32B 27/08* (2006.01)
*C08L 23/06* (2006.01)
*C08L 23/16* (2006.01)

(52) U.S. Cl.
CPC .............. *B32B 27/32* (2013.01); *B32B 27/08* (2013.01); *C08L 23/06* (2013.01); *C08L 23/16* (2013.01); *B32B 2270/00* (2013.01); *B32B 2307/31* (2013.01); *B32B 2323/043* (2013.01); *B32B 2323/046* (2013.01); *B32B 2439/70* (2013.01);
(Continued)

(58) Field of Classification Search
CPC .......... B29C 48/08; C08L 23/16; C08L 23/06; C08L 2203/162; C08L 2205/03; B32B 27/08; B32B 27/32; B32B 2270/00; B32B 2307/31; B32B 2323/043; B32B 2323/046; B32B 2439/70
USPC .............................. 428/200, 35.7; 264/210.2
See application file for complete search history.

(56) References Cited

U.S. PATENT DOCUMENTS

| 4,764,404 A | 8/1988 | Genske et al. |
| 4,778,697 A | 10/1988 | Genske et al. |
| 5,236,963 A | 8/1993 | Jacoby et al. |

(Continued)

FOREIGN PATENT DOCUMENTS

| JP | 2015171778 A | 10/2015 |
| WO | 9533006 A1 | 12/1995 |
| WO | WO2012044730 | * 4/2012 |

OTHER PUBLICATIONS

DOW DS6D81 Data Sheet (Year: 2021).*
(Continued)

*Primary Examiner* — Michael C Miggins

(57) ABSTRACT

The present invention is directed to hot-fill/retort packaging films having a sealant layer composition comprising a first propylene-ethylene copolymer, a second propylene-ethylene copolymer and a polyethylene. Hot-fill/retort packaging films are provided herein having a sealant layer composition that exhibits an ultimate hot tack within a range from 88 N/m to 876 H/m (0.5 lb./in to 5 lb./in) at a temperature within the range from 116° C. to 182° C. (240° F. to 360° F.).

20 Claims, 3 Drawing Sheets

(52) U.S. Cl.
CPC ..... *C08L 2203/162* (2013.01); *C08L 2205/03* (2013.01)

(56) References Cited

U.S. PATENT DOCUMENTS

| | | | |
|---|---|---|---|
| 5,407,751 | A | 4/1995 | Genske et al. |
| 6,127,043 | A | 10/2000 | Lange |
| 6,262,174 | B1 | 7/2001 | Cooper et al. |
| 6,599,639 | B2 | 7/2003 | Dayrit et al. |
| 8,211,533 | B2 | 7/2012 | Breck et al. |
| 8,916,249 | B2 | 12/2014 | Liang et al. |
| 8,921,484 | B2 | 12/2014 | Liang et al. |
| 9,156,972 | B2 | 10/2015 | Duguid et al. |
| 2010/0255232 | A1 | 10/2010 | Duguid et al. |
| 2013/0177720 | A1* | 7/2013 | Liang .................. C08F 297/08 428/35.2 |
| 2013/0183465 | A1 | 7/2013 | Liang et al. |
| 2014/0065382 | A1* | 3/2014 | Koehn .................. B29C 48/08 428/200 |
| 2014/0377548 | A1 | 12/2014 | Billouard et al. |

OTHER PUBLICATIONS

Brakem RP650 Data Sheet (Year: 2021).*
VERISFY 2000 DATA sheet (Year: 2021).*
Versify (TM) Plastomers et al: "Specialty Elastomers from Dow Application Versatility—Overview of Product Grades Product Contributions by Application", Oct. 20, 2016 (Oct. 20, 2016), XP055716139, Retrieved from the Internet: URL:https://msdssearch.dow.com/PublishedLiteratureDOWCOM/dh_0259/0901b80380259303.pdf.
ExxonMobil, "Vistamax™ Performance Polymer 3000 Propylene Elastomer", Product Datasheet, pp. 1-2, Jul. 14, 2020, Retrieved from internet URL: https://www.exxonmobilchemical.com/en/chemicals/webapi/dps/v1/datasheets/150000000064/0/en.
ExxonMobil, "Vistamax™ Performance Polymer 3980FL Propylene Elastomer", Product Datasheet, pp. 1-2, Jul. 14, 2020, Retrieved from internet URL: https://www.exxonmobilchemical.com/en/chemicals/webapi/dps/v1/datasheets/150000000363/0/en.
The Dow Chemical Company, INFUSE Olefin Block Copolymers Product Selection Guide, published Jun. 2015, pp. 1-4.

* cited by examiner

PACKAGING FILMS WITH IMPROVED HOT-TACK PERFORMANCE

BACKGROUND OF THE INVENTION

The present invention relates generally to primary packaging for food, and in particular to hot-fill/retort packaging films having a sealant layer composition that improves hot-tack properties of the packaging films.

The following description of the background and embodiments of the invention thereafter is provided to aid in understanding the invention, but is not admitted to describe or constitute prior art to the invention. The contents of the articles, patents, and patent applications, and all other documents and electronically available information mentioned or cited in this application, are hereby incorporated by reference in their entirety to the same extent as if each individual publication was specifically and individually indicated to be incorporated by reference, including any references cited in the articles, patents, patent applications and documents cited herein, except to the extent they may directly contradict the present disclosure. Applicant reserves the right to physically incorporate into this application any and all materials and information from any such articles, patents, patent applications, or other documents.

It is common practice in packaging many goods, including food items, to use what is generally known as form-fill-seal packaging process. For example, in a vertical form-fill-seal (VFFS) operation, flexible plastic film is fed from a roll-stock to a tube former where a tube is fashioned from the film into a vertically dependent, upwardly open tube having overlapping longitudinal edges. These overlapping edges are subsequently sealed together longitudinally forming a back-seam, and the end of the tube is sealed together by a pair of transverse heat-seals which are vertically spaced apart and separated by a knife; forming the top of one pouch and the bottom of the next. Typically, a lap-type, fin-type or butt-type seal configuration is used to form the longitudinal back-seam of the package, and a butt-type configuration is used form the transverse seals. The tube is filled with a measured quantity of the product to be packaged. In liquid or slurry-containing pouches, rollers may be used to compress the outside of the pouch to eliminate headspace. Shortly thereafter, another sealing operation, typically performed after the filled tube has been downwardly advanced, completes enclosure of the product in the package and creates the bottom of the next pouch. In these sealing operations, heat seals affix the packaging material to itself. Heat seals of a vertical form-fill-seal package need to have sufficient seal strength in order to resist the physical and mechanical abuse imposed by the relatively fast-moving sealing operations. "Seal strength" is the strength of a heat seal at ambient temperature after the seal has been formed. Heat seals are strongest after they have cooled to ambient temperature. However, in order for a VFFS to operate at a commercially relevant pace, packages are filled with product before the heat seals have had time to completely cool. At this point, the heat seals have not completely solidified (or recrystallized), which generally reduces the maximum seal strength. Hot tack is defined as the seal strength of a heat seal immediately after the sealing operation and before it has cooled down and reached its maximum seal strength. For relatively fast-moving sealing operations, heat seals need to rapidly exhibit sufficient hot tack. Otherwise, the heat seals will be destroyed by the weight of the product when the package is filled. While it is important that the films exhibit sufficient hot tack to maintain seal integrity, it is also essential that the films do not stick to themselves or the packaging equipment during the packaging process especially at temperatures below the hot-fill process.

Quite often, oxygen sensitive foods are sterilized by a hot-fill process during the packaging operation, or a retort process after the product is packaged. Such foods may include, but are not limited to bulk liquids like soups and sauces, and some vegetable and meat products. These heat seals need to withstand shearing and/or compression forces resulting from filling at high temperatures, and remain intact during subsequent handling, sterilization, pack-out, and shipping processes. For example, for hot-fill processes, product can be filled at temperatures over 99° C. (210° F.). Pouches filled hot will retain heat, further increasing the importance of "hot tack" strength at high temperature. The pouch is then placed in retort racks and put through the retort process. Retort conditions can vary dramatically, from continuous processing without overpressure to various types of batch processing (water spray, water immersion, steam, Shaka, rotary) with overpressure. Temperatures can vary in a range from 104° C. to 133° C. (220° F. to 270° F.) for as little as a few minutes up to several hours, depending on the process. Conventional hot-fill/retort packaging films have limited application at the higher temperatures because of insufficient hot tack and/or they have a tendency to stick to themselves, neighboring pouches, or equipment during the packaging process.

Consequently, a need exists in the packaging industry to develop new packaging materials which have sufficient hot tack properties at the elevated temperatures typically encountered during a hot-fill/retort operation.

SUMMARY OF THE INVENTION

Embodiments of the present invention are directed to hot-fill/retort packaging films having a sealant layer composition that improves the hot-tack properties of the film. Generally, with hot-fill packaging operations, higher seal initiation temperatures are desirable as this limits the self-tacking or sticking of the film to equipment. Thus, with the hot-fill/retort packaging films described herein, a continuous hot-fill vertical form-fil-seal packaging process is achieved at a commercially relevant pace. The seal initiation temperature is the first temperature above ambient at which a seal can form by applying a given temperature and pressure to a given thickness of packaging film for a given length of time. Towards this end, hot-fill/retort packaging films are disclosed that comprise a sealant layer composition that increases the seal initiation temperature over conventional hot-fill/retort packaging films. In some embodiments, the hot-fill/retort packaging films provided herein have a seal initiation temperature within a range from 127° C. to 204° C. (260° F. to 400° F.). In some embodiments, hot-fill/retort packaging films are provided that do not hot tack at or below 110° C. (230° F.).

Hot-fill/retort packaging films described by this disclosure comprise a sealant layer composition that provides a seal strength within a range from 175 N/m to 5254 N/m (1 lb./in to 30 lb/in), or from 1751 N/m to 4378 N/m (10 lb./in to 25 lb/in), or 2627 N/m to 3503 N/m (15 lb./in to 20 lb./in) when the film is heat sealed to itself at a temperature within a range from 127° C. to 204° C. (260° F. to 400° F.) under 40 psi and a dwell time of 1 second.

The hot-fill/retort packaging films disclosed herein exhibit an ultimate hot tack within a temperature range that overlaps the seal strength temperature range, e.g., from 127° C. to 204° C. (260° F. to 400° F.). Ultimate hot tack is the highest seal strength of a heat seal at temperatures above the initiation temperature immediately after sealing and before the seal has cooled down and reached maximum strength. Towards this end, hot-fill/retort packaging films provided herein have a sealant layer composition that exhibits an ultimate hot tack within a range from 88 N/m to 876 N/m (0.5 lb./in to 5 lb./in) at a temperature within the range from 110° C. to 182° C. (230° F. to 360° F.). In some embodiments, the hot-fill/retort packaging films have a sealant layer composition that provides an ultimate hot tack within a range from 105 N/m to 525 N/m (0.6 lb./in to 3 lb./in) at a temperature within the range from 110° C. to 182° C. (230° F. to 360° F.). In some embodiments, the hot-fill/retort packaging films have a sealant layer composition that provides an ultimate hot tack of less than 50 N/m (0.29 lb/in) at 110° C. (230° F.).

Provided herein are hot-fill/retort packaging films having a sealant layer composition comprising a first propylene-ethylene copolymer, a second propylene-ethylene copolymer and a polyethylene. The term "propylene-ethylene copolymer" refers to copolymers comprising two types of monomers, between 51 and 99% by weight of propylene monomer and between 1 and 49% by weight of ethylene monomer relative to the total weight of the propylene-ethylene copolymer. The propylene-ethylene copolymers may include random, block and/or grafted copolymers, and may also include more than two repeating components wherein the dominant monomer is propylene. Propylene-ethylene copolymers are distinctly different than propylene homopolymers which do not include a different monomer other than propylene. Propylene-ethylene copolymers are also distinctly different than ethylene-propylene copolymers because ethylene-propylene copolymers are ethylene-based rather than propylene-based copolymers. Consequently, propylene-ethylene copolymers can have different physical properties compared to ethylene-propylene copolymers. Conventional hot-fill/retort packaging films have a sealant layer composition comprising ethylene-propylene copolymers such as those described in U.S. Pat. Nos. 4,764,404 and 4,778,697.

Also provided herein are packages, especially for foodstuffs. The hot-fill/retort packaging films described herein can be readily converted into various packaging configurations, including but not limited to liners, bags, pillow pouches, stand-up pouches, quad pouches, zipped pouches, over-wraps, lidding films, thermoformed trays, vacuum packages, vacuum skin packaging, horizontal form-fill-seal packages, and especially vertical form-fill-seal packages.

In some embodiments, food packages in the form of form-fill-seal packages are provided. Such embodiments may include horizontal and vertical form-fill-seal food packages suitable for hot-fill/retort sterilization.

Further provided herein are methods for packaging a hot-fill/retort food product. The methods comprise: obtaining any packaging film having a sealant layer composition as disclosed herein; packaging a food product within the packaging film, and sterilizing the food product by a hot-fill/retort process.

BRIEF DESCRIPTION OF THE DRAWINGS

Further features and advantages of the hot-fill/retort packaging films will become apparent from the following detailed description, taken in combination with the appended drawings, in which.

DETAILED DESCRIPTION OF THE INVENTION

Figure 1:
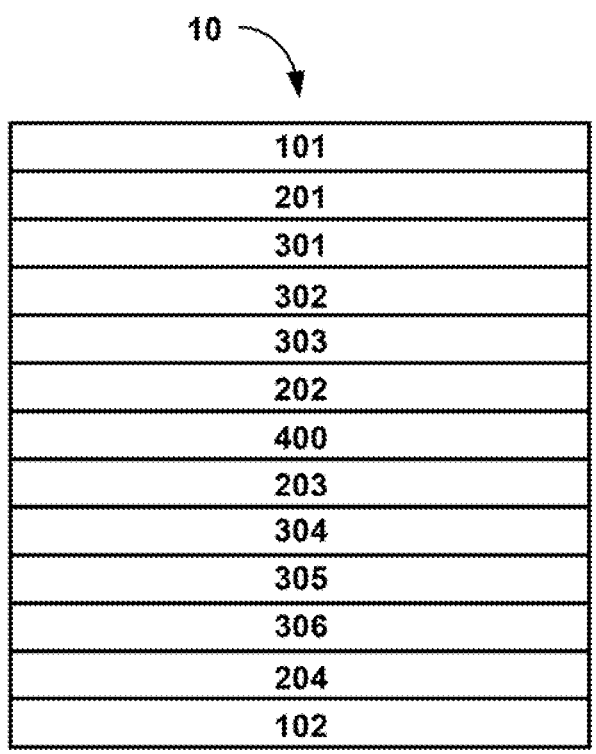
FIG. 1 illustrates a conceptual schematic of one embodiment of a film according to the present invention.

The hot-fill/retort packaging films now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Sealant Layer Compositions

The sealant layer composition comprises a first propylene-ethylene copolymer, a second propylene-ethylene copolymer, and a polyethylene. The sealant layer of the hot-fill/retort packaging films is designed specifically for heat sealing to itself or another polyolefin material.

In some embodiments, the first propylene-ethylene copolymer can be characterized as having a flexural modulus at 0.05 in/min (0.127 cm/min), 1% secant within a range from 2,000 psi to 100,000 psi as measured in accordance with ASTM D-790 test method. In such embodiments, the first propylene-ethylene copolymer may be present in an amount within a range from 10% to 90%, 15% to 50%, or 20% to 35% by weight relative to the total weight of the sealant layer.

In some embodiments, the second propylene-ethylene copolymer can be characterized as having a flexural modulus at 0.05 in/min (0.127 cm/min), 1% secant within a range from 101,000 psi to 300,000 psi as measured in accordance with ASTM D-790 test method. In such embodiments, the second propylene-ethylene copolymer may be present in an amount within a range from 5% to 65%, 15% to 70%, or 25% to 65% by weight relative to the total weight of the sealant layer.

In some embodiments, the difference between flexural moduli of the first and second propylene-ethylene copolymers can be greater than 25,000 psi, 50,000 psi, 75,000 psi, or 100,000 psi as measured at 0.05 in/min (0.127 cm/min), 1% secant in accordance with ASTM D-790 test method.

The polyethylene of the sealant layer composition can be any polyethylene. In some embodiments, the polyethylene comprises a linear low density polyethylene. In other embodiments, the polyethylene comprises a high density polyethylene. In such embodiments, the polyethylene may be present in an amount within a range from 1% to 50%, 2.5% to 30%, or 5% to 20% by weight relative to the total weight of the sealant layer.

The hot-fill/retort packaging films may be a monolayer or a multilayer film comprising the sealant layer composition as described herein. The sealant layer composition may be present in more than one layer of the packaging film. In some embodiments, the hot-fill/retort packaging films disclosed herein are palindromic. Palindromic films are symmetrical film structures around a central core layer and have two sealant layers.

The hot-fill/retort packaging films may include any number of layers as needed depending upon the requirements of a particular packaging application. These additional layers may include, but are not limited to oxygen barrier layers, moisture barrier layers, chemical barrier layers, abuse layers, tie or adhesive layers, bulk layers, and odor and oxygen scavenging layers. The sealant layer can be combined with many different layers of materials such as, but not limited to, plastics, papers, non-woven materials, metal foils to form various packaging structures. In some embodiments, the hot-fill/retort packaging films are considered oxygen barrier films and have an oxygen transmission rate ($O_2TR$) value of less than or equal to 155 $cm^3/m^2/24$ hours (10 $cm^3/100$ $in^2/24$ hours) at 1 atmosphere, 23° C. and 0% RH.

The hot-fill/retort packaging films can be fabricated by several different conventional methods known in the art including but not limited to blown film coextrusion, slot cast coextrusion, extrusion lamination, extrusion coating and combinations thereof. In some embodiments, the hot-fill/retort packaging film can be produced using a coextrusion blown film line. In this method, the line can be equipped with multiple extruders (for multilayer hot-fill/retort packaging films) which feed into a multi-manifold circular die head through which the film layers can be forced and formed into a cylindrical multilayer film bubble. The bubble can be quenched, then collapsed and formed into a multilayer film. Films produced using blown film processes are known in the art and have been described, for example, in The Encyclopedia of Chemical Technology, Kirk-Othmer, 3rd ed., John Wiley & Sons, New York, 1981, Vol. 16, pp. 416-417 and Vol. 18, pp. 191-192, the disclosures of which are incorporated herein by reference. Typically, the resins and any additives forming one or more film layers can be introduced to an extruder where the resins were melt-plastified by heating and then transferred to an extrusion (or coextrusion) die for formation into the bubble or tube. If desired, resins can be blended or mechanically mixed by well-known methods using commercially available equipment including tumblers, mixers or blenders, and well-known additives such as processing aids, slip agents, anti-blocking agents, pigments and mixtures thereof may be incorporated into the resin by blending prior to extrusion. The extruder and die temperatures will generally depend upon the particular resin (s) containing mixtures being processed, and suitable temperature ranges for commercially available resins are generally known in the art or are provided in technical bulletins made available by resin manufacturers. The specific conditions for operation of any specific extrusion equipment can be readily determined by one skilled in the art. After formation, the bubble can be cooled, collapsed or separated into two films, slit, and wound around a roller for further processing.

Once the hot-fill/retort packaging film is wound around a roller, it can be further converted into a package or package component including, but not limited to liners, bags, pillow pouches, stand-up pouches, quad pouches, zipped pouches, over-wraps, lidding films, thermoformed trays, vacuum packages, vacuum skin packaging, horizontal form-fill-seal packages, and especially vertical form-fill-seal packages.

WORKING EXAMPLES

The following examples are intended to be representative of specific embodiments of hot-fill/retort packaging films and are not intended to be limiting to the scope of the invention.

FIG. 1 illustrates one embodiment of a hot-fill/retort packaging film having a palindromic structure of thirteen layers. In this drawing, hot-fill/retort packaging film 10 comprises in the following order, a first sealant layer 101, a tie layer 201, a first barrier layer 301, a second barrier layer 302, a third barrier layer 303, a second tie layer 202, a core layer 400, a third tie layer 203, a fourth barrier layer 304, a fifth barrier layer 305, a sixth barrier layer 306, a fourth tie layer 204, and a second sealant layer 102. This embodiment can be produced using a blown film process by co-extruding a seven-layer film having sealant layer 101, tie layer 201, first barrier layer 301, second barrier layer 302, third barrier layer 303, second tie layer 202, and core layer 400, then collapsing the blown bubble onto itself to form a thirteen layer palindromic film.

In the following examples, each film had a thirteen layer construction as depicted in FIG. 1 and were produced from a seven layer collapsed blown film as described above. The total thickness of the films were each approximately of 127μ (micron) (5 mil). Detail descriptions of a non-limiting exemplary first polypropylene-ethylene copolymer, PP-$PE_1$, second first polypropylene-ethylene copolymer, PP-$PE_2$, first polyethylene, $PE_1$ and second polyethylene, $PE_2$ are provided below following the Comparative Examples description.

Example 1

Example 1 (Ex-1) had a structure and layer compositions as described below and as illustrated in FIG. 1.

$1^{st}$ Sealant Layer 101: 61 wt.-% of PP-$PE_2$, 28 wt.-% of PP-$PE_1$, and 10 wt.-% of $PE_2$, and 1.0 wt.-% of processing additives.

$1^{st}$ Tie Layer 201: 100 wt.-% of a maleic anhydride grafted polypropylene having a density of 0.920 g/cm³ and a melt index of 3.5 dg/min (2.16 kg @ 230° C.)-AMPLIFY® TY XUS 69109.00 (The Dow Chemical Company, Midland, Mich.).

$1^{st}$ Barrier Layer 301: 80 Wt.-% of a nylon 6 having a melting temperature of 220° C. and a density of 1.13 g/cm³-Ultramid® B36 01 (BASF Corporation, Wyandotte, Mich.) and 20 wt.-% of a nylon 6/66 having a melting temperature of 192-194° C. and a density of 1.12 g/cm³-Ultramid® C40 L 01 (BASF Corporation, Wyandotte, Mich.).

$2^{nd}$ Barrier Layer 302: 100 wt.-% of an ethylene vinyl alcohol copolymer having a melting temperature of 188° C. and a density of 1.19 g/cm³-Soarnol™ RB7405B (Soarus LLC, Arlington Heights, Ill.).

$3^{rd}$ Barrier Layer 303: Same as 1st Barrier Layer 301.

$2^{nd}$ Tie Layer 202: 80 wt.-% of a linear low density polyethylene having a melting temperature of 119° C. and a density of 1.0 g/cm³-DOWLEX™ 2045G (The Dow Chemical Company, Midland, Mich.) and 20 wt.-% of am maleic anhydride modified linear low density polyethylene having a melting temperature of 98° C. and a density of 0.91 g/cm³-DuPont™ Bynel® 41E710 (DuPont Chemical Company, Wilmington, Del.).

Core Layer 400: 100 wt.-% of an ethylene-based hexene plastomer a melting temperature of 93.9° C. and a density of 0.90 g/cm³-ExxonMobil EXACT™ 3131 (ExxonMobil Chemical Company, Houston, Tex.).

$3^{rd}$ Tie Layer 203: Same as $2^{nd}$ Tie Layer 202.

$4^{th}$ Barrier Layer 304: Same as 1st Barrier Layer 301.

$5^{th}$ Barrier Layer 305: Same as $2^{nd}$ Barrier Layer 302.

$6^{th}$ Barrier Layer 306: Same as 1st Barrier Layer 301.

$4^{th}$ Tie Layer 204: Same as 1st Tie Layer 201.

$2^{nd}$ Sealant Layer 102: Same as 1st Sealant Layer 101.

Example 2

Example 2 (Ex-2) had the same structure and layer compositions as described above for Example 1 except for $1^{st}$ and $2^{nd}$ Sealant Layers 101, 102 had the following composition:

$1^{st}/2^{nd}$ Sealant Layers 101/102: 56 wt.-% of PP-PE$_2$, 28 wt.-% of PP-PE$_1$, and 15 wt.-% of PE$_2$, and 1.0 wt.-% of processing additives.

Example 3

Example 3 (EX-3) had the same structure and layer compositions as described above for Example 1 except for $1^{st}$ and $2^{nd}$ Sealant Layers 101, 102 had the following composition:

$1^{st}/2^{nd}$ Sealant Layers 101/102: 51 wt.-% of PP-PE$_2$, 28 wt.-% of PP-PE$_1$, 10 wt.-% of PE$_1$, and 10 wt.-% of PE$_2$, and 1.0 wt.-% of processing additives.

Example 4

Example 4 (Ex-4) had the same structure and layer compositions as described above for Example 1 except for $1^{st}$ and $2^{nd}$ Sealant Layers 101, 102 had the following composition:

$1^{st}/2^{nd}$ Sealant Layers 101/102: 61 wt.-% of PP-PE$_2$, 28 wt.-% of PP-PE$_1$, 10 wt.-% of PE$_1$, and 1.0 wt.-% of processing additives.

Comparative Example-1

Comparative Example-1 (Com.Ex.-1) had the same structure and layer compositions as described above for Example 1 except for 1st and $2^{nd}$ Sealant Layers 101, 102 had the following composition:

$1^{st}/2^{nd}$ Sealant Layers 101/102: 82.4 wt.-% of a linear low density polyethylene having a melting temperature of 120° C. and a density of 0.921 g/cm$^3$-DOWLEX™ 2645G (The Dow Chemical Company, Midland, Mich.), 10 wt.-% of an ultra-low density polyethylene having a melting temperature of 101° C. and a density of 0.914 g/cm$^3$-ATTANE™ NG 4701G (The Dow Chemical Company, Midland, Mich.), and 7.6 wt.-% of processing additives.

Comparative Example-2

Comparative Example-2 (Com.Ex.-2) had a three-layer structure and layer compositions as described below:

1st Sealant Layer: 40 wt.-% of PP-PE$_2$, 40 wt.-% of PE-PP and 20 wt.-% of PE$_2$.

$1^{st}$ Tie Layer: 100 wt.-% of a maleic anhydride grafted polypropylene having a density of 0.920 g/cm$^3$ and a melt index of 3.5 dg/min (2.16 kg @ 230° C.)-AMPLIFY® TY XUS 69109.00 (The Dow Chemical Company, Midland, Mich.).

$1^{st}$ Barrier Layer: 100 wt.-% of a nylon 6 having a melting temperature of 220° C. and a density of 1.13 g/cm$^3$- Ultramid® B36 01 (BASF Corporation, Wyandotte, Mich.)

PP-PE$_1$=$1^{st}$ Polypropylene/Ethylene copolymer having a flexural modulus at 0.05 in/min (0.127 cm/min), 1% secant within the range from 2,000 psi to 100,000 psi as measured in accordance with ASTM D-790 test method. Non-limiting commercially available examples include such polypropylene/ethylene copolymers such as those sold under the trademark VERSIFY™ 2000 and 3000 by The Dow Chemical Company, Inc., Midland, Mich. The VERSIFY™ 2000 copolymer has a density of 0.89 g/cm$^3$, a total crystallinity of 35% and a flexural modulus (1% secant) of 52,000 psi as measured according to ASTM test method D-790. The VERSIFY™ 3000 copolymer has a density of 0.89 g/cm$^3$, a total crystallinity of 44% and a flexural modulus (1% secant) of 56,500 psi as measured according to ASTM test method D-790.

PP-PE$_2$=$2^{nd}$ Polypropylene/Ethylene copolymer having a flexural modulus at 0.05 in/min (0.127 cm/min), 1% secant within the range from 101,000 psi to 300,000 psi as measured in accordance with ASTM D-790 test method. Non-limiting commercially available examples include polypropylene/ethylene copolymers such as LyondellBasell Pro-fax SA861 random polypropylene supplied by LyondellBasell, Houston, Tex. and Braskem PP RP 650 random polypropylene supplied by Braskem America Inc., Philadelphia, Pa. The LyondellBasell Pro-fax SA861 copolymer has a density of 0.90 g/cm$^3$, a melt flow of 6.5 g/10 min, and a flexural modulus (1% secant at 0.05 in/min) of 133,000 psi as measured according to ASTM test method D-790. The Braskem PP RP 650 copolymer has a melt flow rate of 2.0 g/10 min (230° C./2.16 kg) and a flexural modulus (1% secant at 0.05 in/min) of 170,000 psi as measured according to ASTM test method D-790.

PE-PP=Polyethylene/propylene copolymer having a mole ratio of 60% to 80% ethylene and 20% to 60% propylene. A commercially available example of such as material is TAFMER™ P supplied by Mitsui Petrochemical Industries, Ltd.

PE$_1$=High density polyethylene (HDPE). A non-limiting commercially available example of such a material includes LyondellBasell Alathon® M6020 supplied by LyondellBasell, Houston, Tex. which has a density of 0.96 g/cm$^3$ and a melting temperature of between 199-210° C.

PE$_2$=Linear low density polyethylene (LLDPE). A specific non-limiting commercially available examples of a suitable LLDPE includes DOWLEX™ 2045G having a specific gravity of 0.922, a melt flow rate of 1.0 g/10 min, and a melting temperature of 118.9° C. which can be obtained from The Dow Chemical Company, Inc., Midland, Mich.

Figure 2:
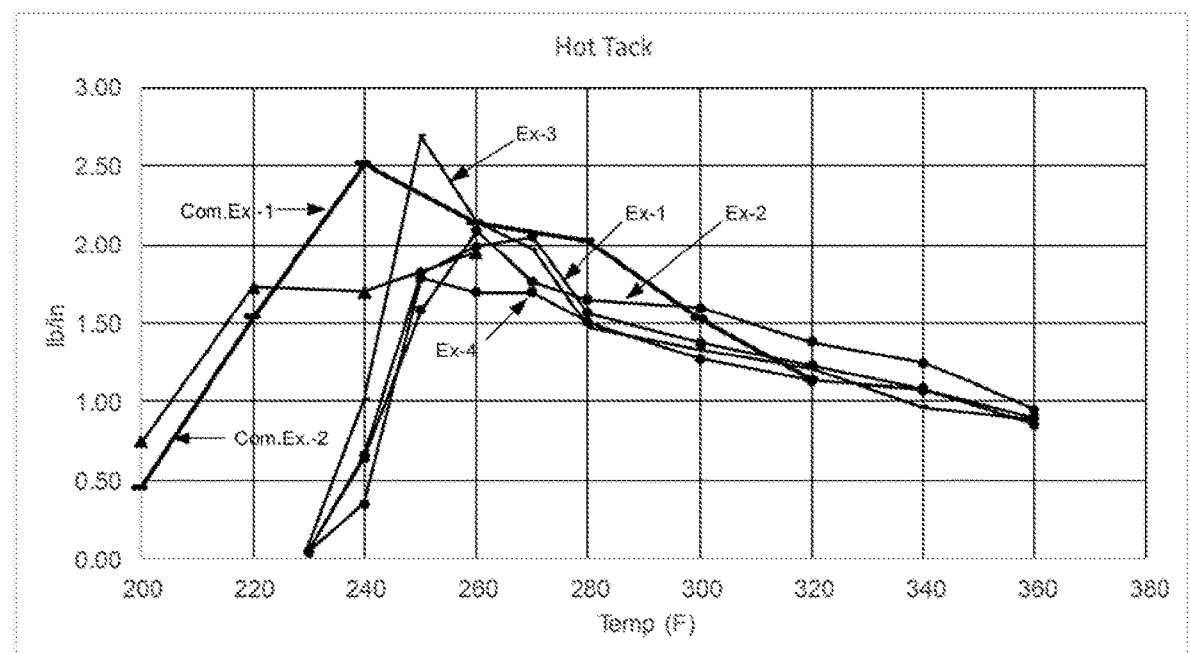
FIG. 2 illustrates a chart 1 of hot tack values at various temperatures of hot-fill/retort packaging films with different sealant layer compositions.

The hot tack properties of Examples 1, 2, 3 and 4 and Comparative Examples 1 and 2 were measured by heat sealing the films to themselves (sealant layer to sealant layer) at different temperatures under 40 psi, a one second dwell time, and allowed to cool for 0.1 second. The hot tack values at different temperatures of these examples are reported in Chart 1 in FIG. 2.

Figure 3:
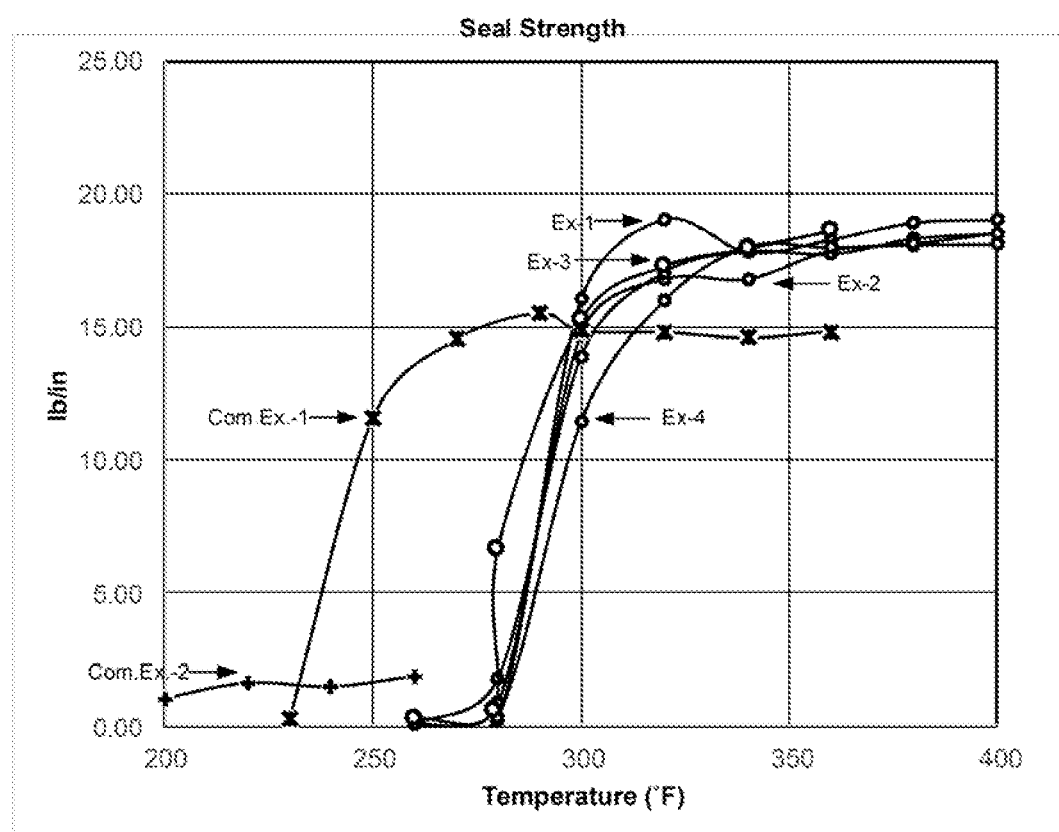
FIG. 3 illustrates a chart 2 of seal strength values at various temperatures of hot-fill/retort packaging films with different sealant layer compositions.

To demonstrate the increase of the seal initiation temperature, broadening of the seal initiation temperature range and/or increase in seal strength at elevated temperatures, the films were heat sealed to itself (sealant layer to sealant layer) at different temperatures under 40 psi and a one second dwell time, and allowed to cool to ambient temperature. The seal strengths or force required to delaminate the sealed films at a 90 degree angle was measured using an Instron Tensile Tester. The results are reported in CHART 2 in FIG. 3.

The seal strength and hot tack test results indicate that the hot-fill/retort packaging films having a sealant composition of a first polypropylene-ethylene copolymer, a second polypropylene-ethylene copolymer and polyethylene exhibit an increase of seal initiation temperature of about 50 degrees from 127° C. to 204° C. (260° F. to 400° F.) and/or an increase in seal strength compared to conventional hot-fill/ retort films without the sealant layer composition. The tests also demonstrate that hot-fill/retort packaging films self-tack to themselves at temperatures above 110° C. (230° F.), which is required for hot-fill processing.

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A hot-fill/retort sealant film comprising:
    a sealant layer composition comprising:
        i) a first propylene-ethylene copolymer
        ii) a second propylene-ethylene copolymer, and
        iii) a polyethylene;
    wherein the first propylene-ethylene copolymer has a flexural modulus at 0.127 cm/min (0.05 in/min), 1% secant within a range from 124.1 N/mm$^2$ to 689.5 N/mm$^2$ (18,000 to 100,000 psi) as measured in accordance with ASTM D-790 test method and wherein the second propylene-ethylene copolymer is a random propylene-ethylene copolymer.

2. The hot-fill/retort sealant film according to claim 1, wherein the first propylene-ethylene copolymer is present in an amount within a range from 10% to 90% by weight relative to the total weight of the sealant layer.

3. The hot-fill/retort sealant film according to claim 1, wherein the first propylene-ethylene copolymer is present in an amount within a range from 15% to 50% by weight relative to the total weight of the sealant layer.

4. The hot-fill/retort sealant film according to claim 1, wherein the first propylene-ethylene copolymer is present in an amount within a range from 20% to 35% by weight relative to the total weight of the sealant layer.

5. The hot-fill/retort sealant film according to claim 1, wherein the second propylene-ethylene copolymer has a flexural modulus at 0.127 cm/min (0.05 in/min), 1% secant within a range from 696.4 N/mm$^2$ to 2,068.4 N/mm$^2$ (101,000 to 300,000 psi) as measured in accordance with ASTM D-790 test method.

6. The hot-fill/retort sealant film according to claim 1, wherein the second propylene-ethylene copolymer is present in an amount within a range from 5% to 75% by weight relative to the total weight of the sealant layer.

7. The hot-fill/retort sealant film according to claim 1, wherein the second propylene-ethylene copolymer is present in an amount within a range from 25% to 65% by weight relative to the total weight of the sealant layer.

8. The hot-fill/retort sealant film according to claim 1, wherein the polyethylene comprises a linear low density polyethylene.

9. The hot-fill/retort sealant film according to claim 1, wherein the polyethylene comprises a high density polyethylene.

10. The hot-fill/retort sealant film according to claim 1, wherein the polyethylene polymer is present in an amount within a range from 1% to 50% by weight relative to the total weight of the sealant layer.

11. The hot-fill/retort sealant film according to claim 1, wherein the polyethylene polymer is present in an amount within a range from 2.5% to 30% by weight relative to the total weight of the sealant layer.

12. The hot-fill/retort sealant film according to claim 1, wherein the polyethylene polymer is present in an amount within a range from 5% to 20% by weight relative to the total weight of the sealant layer.

13. The hot-fill/retort sealant film according to claim 1, further comprising a seal initiation temperature within a range from 127° C. to 204° C. (260° F. to 400° F.).

14. The hot-fill/retort sealant film according to claim 1, further comprising a seal strength within a range from 175 N/m to 5254 N/m (1 lb/in to 30 lb/in) when the film is heat sealed to itself at a temperature within a range from 127° C. to 204° C. (260° F. to 400° F.) under 0.28 N/mm$^2$ (40 psi) and a dwell time of 1 second.

15. The hot-fill/retort sealant film according to claim 1, further comprising a seal strength within a range from 1751 N/m to 4378 N/m (10 lb/in to 25 lb/in) when the film is heat sealed to itself at a temperature within the range from 127° C. to 204° C. (260° F. to 400° F.) under 0.28 N/mm$^2$ (40 psi) and a dwell time of 1 second.

16. The hot-fill/retort sealant film according to claim 1, further comprising a seal strength of within a range from 2627 N/m to 3503 N/m (15 lb/in to 20 lb/in) when the film is heat sealed to itself at a temperature within the range from 127° C. to 204° C. (260° F. to 400° F.) under 0.28 N/mm$^2$ (40 psi) and a dwell time of 1 second.

17. The hot-fill/retort sealant film according to claim 1, further comprising an ultimate hot tack of less than 50 N/m (0.29 lb/in) at 110° C. (230° F.).

18. The hot-fill/retort sealant film according to claim 1, further comprising an ultimate hot tack within a range from 88 N/m to 876 N/m (0.5 lb/in to 5 lb/in) at a temperature within a range from 110° C. to 182° C. (230° F. to 360° F.).

19. The hot-fill/retort sealant film according to claim 1, further comprising an ultimate hot tack within a range from 105 N/m to 525 N/m (0.6 lb/in to 3 lb/in) at a temperature within a range from 110° C. to 182° C. (230° F. to 360° F.).

20. A hot-fill/retort sealant film comprising:
    a sealant layer composition comprising:
        i) a first propylene-ethylene copolymer;
        ii) a second propylene-ethylene copolymer;
        iii) a polyethylene; and,
    wherein the first propylene-ethylene copolymer has a flexural modulus at 0.127 cm/min (0.05 in/min), 1% secant within a range from 124.1 N/mm$^2$ to 689.5 N/mm$^2$ (18,000 to 100,000 psi) as measured in accordance with ASTM D-790 test method and wherein the second propylene-ethylene copolymer is a random propylene-ethylene copolymer having a flexural modulus at 0.127 cm/min (0.05 in/min), 1% secant within a range from 696.4 N/mm$^2$ to 2,068.4 N/mm$^2$ (101,000 to 300,000 psi) as measured in accordance with ASTM D-790 test method.

* * * * *